Nov. 18, 1941.  C. R. RANEY  2,262,905
HARROW
Filed Aug. 17, 1940  2 Sheets-Sheet 1

Inventor
Clemma R. Raney
By Paul Pippel
Atty.

Nov. 18, 1941.  C. R. RANEY  2,262,905
HARROW
Filed Aug. 17, 1940  2 Sheets-Sheet 2
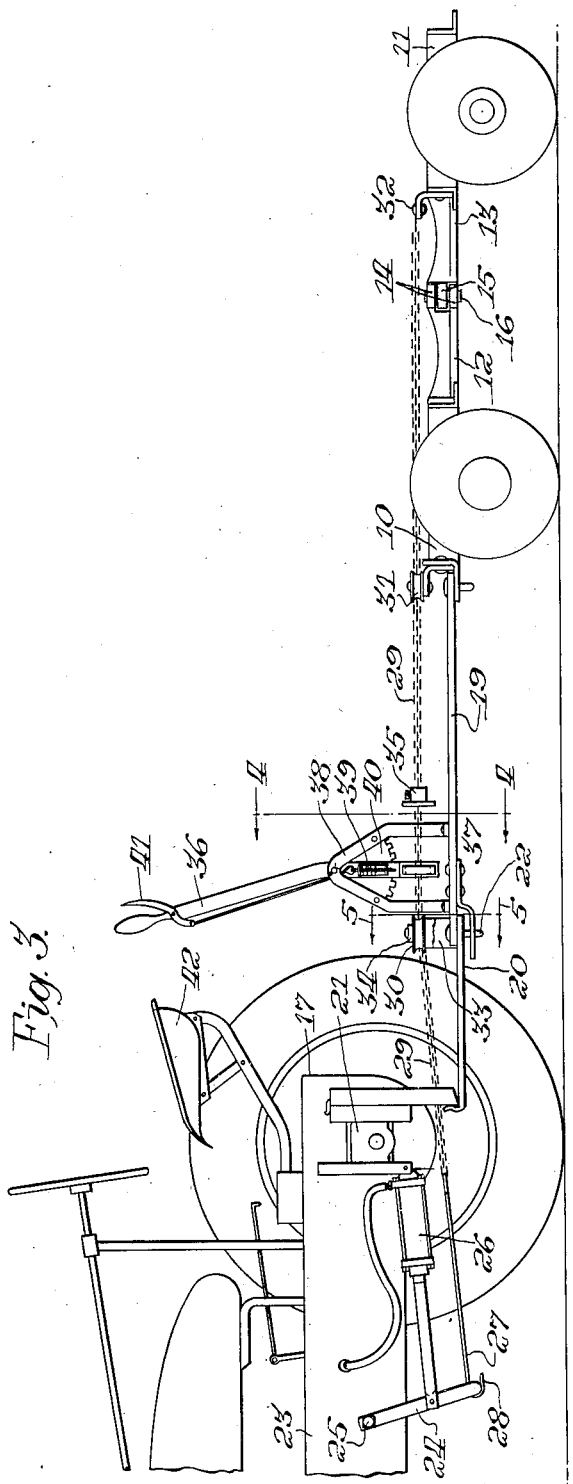
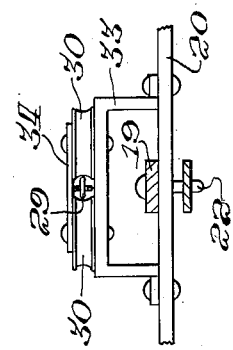
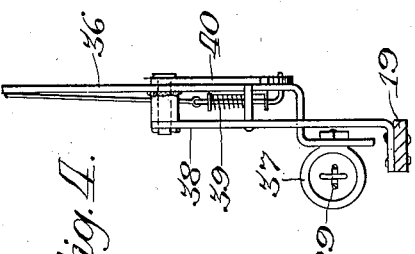
Inventor
Clemma R. Raney
By Paul O. Pippel
Atty.

Patented Nov. 18, 1941

2,262,905

UNITED STATES PATENT OFFICE 2,262,905

HARROW

Clemma R. Raney, Riverside, Ill., assignor to International Harvester Company, a corporation of New Jersey Application August 17, 1940, Serial No. 353,106

18 Claims. (Cl. 55—83)

This invention relates to power angling of harrows. More specifically it relates to the forcing of gangs into working position by means of tractor power.

In the normal operation of an offset disk harrow, the gangs are relatively angled so that they are open toward one side. It has been the practice either to lock the gangs in their working position or to rely upon the pull of the ground to hold them in working position. In some instances, it may be inconvenient to use a lock for holding the gangs, and, with no lock, the gangs may shift widely from the angle of working position because of soil conditions. Accordingly, it is proposed to construct the harrow so that the gangs will come out of angle of their own accord, and to provide a connection between the harrow and the tractor power plant for holding the gangs in working position.

An object of the present invention is to provide an improved offset harrow.

A further object is the provision of means for placing the gangs in working position by means of tractor power.

Another object is the provision of means for adjusting the angle of the gangs in working position. According to the present invention, the gangs of an offset harrow are connected with the pivot point substantially opposite the mid-point of the length of each harrow, so that the gangs tend to run in parallel position even with the pull of the ground upon them. The gangs are forced into working position by means of a connection between the rear gang and the tractor power plant.

In the drawings:

Figure 3 is a side view of the harrow and the tractor;

Figure 4 is a view taken along the line 4—4 of Figure 3; and,

Figure 5 is a view taken along the line 5—5 of Figure 3.

Figure 1:
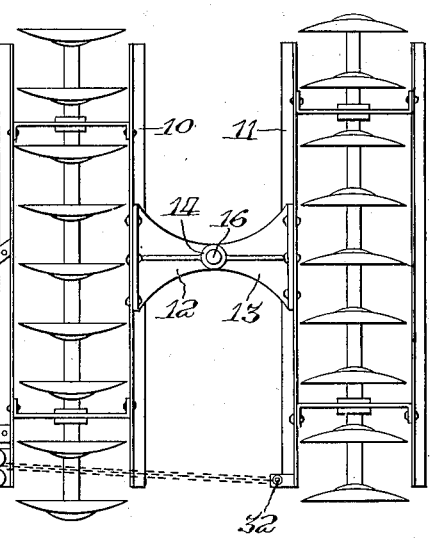
Figure 1 is a plan view of a harrow of the present invention in transport position connected to the rear of a tractor.
Figure 1:
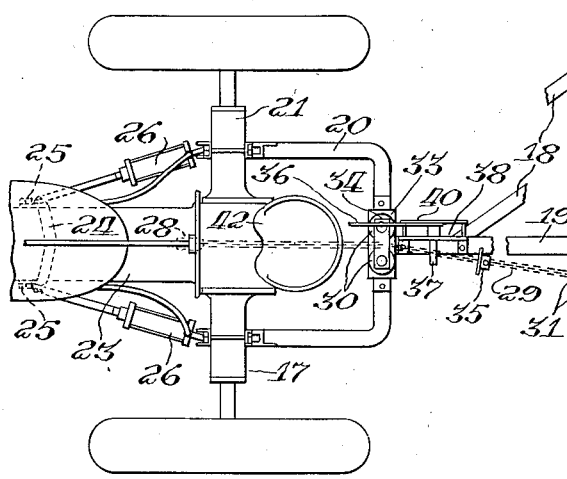

The offset harrow of the present invention comprises a front gang 10, a rear gang 11, and means pivotally connecting the gangs comprising brackets 12 and 13 attached to the front and rear gangs, respectively. As seen in Figure 3, the bracket 12 has spaced clevis portions 14, between which a projection 15 on the rear bracket 13 extends. A pin 16 extends through the clevis portions 14 and the projection 15, completing the pivotal connection with the gangs. It will be observed that the pivot pin 16 is opposite a mid-point on the length of each gang. The harrow is connected to a tractor 17 by means of bars 18 and 19, which, with the front side of the gang 10, form a triangular framework. The front end of the bar 19 is pivotally connected to a U-shaped draw-bar 20 secured to a rear axle 21 on the tractor 17 by means of a pin 22.

As shown more fully in the copending application of Mott, Serial No. 321,154, filed February 28, 1940, a body portion 23 of the tractor 17 is embraced by a U-shaped bail 24 pivotally connected at 25 to the sides of the body. The bail 24 is moved by means of a pair of fluid power devices 26 connected to the rear axle 21 and comprises essentially a cylinder and a piston moving within the cylinder under the action of fluid under pressure, as shown more fully in the patent to Lindgren, No. 2,156,570, May 2, 1939. A rod 27 has a hook portion 28 at one end engaging the U-shaped bail beneath the body of the tractor. A chain 29 is connected at the other end of the rod 27 and extends rearwardly therefrom through a pair of rollers 30 adjacent the pivot pin 22 between a pair of rollers 31 mounted on the front gang 10 to a connection 32 at one end of the rear gang 11.

As seen in Figure 5, the rollers 30 are mounted on an inverted U-shaped member 33 extending upwardly from the tractor draw-bar 20. A piece 34 extends over the top of the rollers 31 so that the chain 29 is completely enclosed by the rollers 30, the U-shaped member 33, and the piece 34. The section of the chain 29 passing between the rollers 30 is directly over the pivot pin 22, so that any pivoting of the harrow with respect to the tractor about the pin 22 has no effect upon the tautness of the chain.

Figure 2:
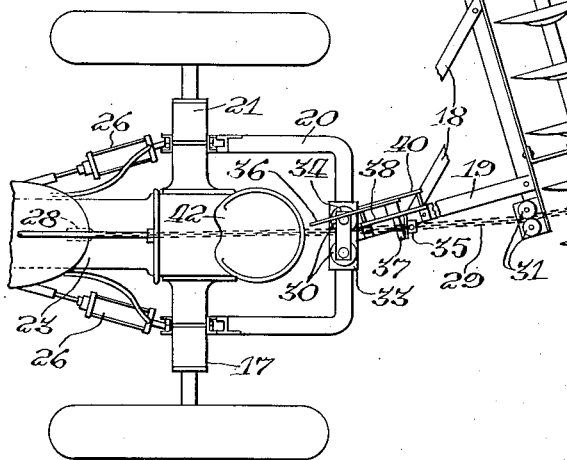
Figure 2 is a plan view similar to Figure 1 with the gangs in working position.

Figures 1 and 3 show the gangs in parallel transport position. When it is desired to place them in working position, fluid under pressure is supplied to the devices 26 so that the U-shaped bail 24 is moved forward. The result is a forward pull upon the chain 29 and the pulling of the rear gang 11 into working position. When it is desired to transport the harrow, or to make a turn to the right, the fluid under pressure is released from the devices 26, and the pull of the ground upon the rear gang 11 will cause the end of the rear gang connected to the chain to move rearwardly. Accordingly, the gangs assume the parallel position of Figure 1. When the gangs are not held at an angle, as shown in Figure 2, they will automatically assume the position of Figure 1, since the pivot point between the gangs at the pin 16 is opposite a mid-point in the length of the gangs. Since there is an equal amount of rear gang on each side of the pivot point, the rear gang tends to run into the transport position regardless of ground conditions.

In some instances, it is desirable to provide an adjustable stop which will limit the movement of the gangs into working position. For this purpose, the stop collar 35, secured to the chain 29, and the lever 36, carrying at its lower end a ring 37 through which the chain extends, have been provided. The lever is pivotally mounted upon a bracket 38 secured to the hitch member 19 and carries a detent mechanism 39 fixable in a number of positions to an arcuate member 40 secured to the bracket 38. The detent mechanism 39 is under control of a release 41 connected to the upper end of the lever 36, which is within easy reach of an operator on a seat 42 of the tractor 17. Abutment of the collar 35 against the ring 37 limits the angle assumed by the gangs in working positions. Variation of this position is effected by angular adjustment of the lever 36, which varies the position of the ring 37 along the chain 29.

It will be apparent from the foregoing description that a new and novel harrow construction has been provided in which the gangs are forced into working position by tractor power and are so constructed that they will automatically run into parallel position suitable for transport or for turning to the right when not held by tractor power. There has also been provided a novel means for effecting adjustment of the angle assumed by the gangs in working position.

The intention is to limit the invention only within the scope of the appended claims.

What is claimed is:

1. In combination, a tractor having a power plant, an offset harrow positioned at the rear of the tractor and comprising front and rear gangs and means forming a connection between the gangs, hitch means connecting the harrow and the tractor for causing the harrow to trail to one side of the tractor, and means for causing the harrow to take a working angle comprising a connection between the tractor power plant and a point on the rear gang to the side of the connection opposite the side to which the harrow is offset with respect to the tractor.

2. In combination, a tractor having a power plant, an offset harrow connected at the rear of the tractor and comprising front and rear gangs, and means connecting the tractor power plant and the rear gang for forcing the rear gang into a working position.

3. In combination, a tractor having a power plant, an offset harrow connected at the rear of the tractor and comprising front and rear gangs and means forming a connection between the front gang and the mid-point of the rear gang, and means connecting the tractor power plant and the rear gang for forcing the rear gang into a working position.

4. In combination, a tractor having a power plant, an offset harrow connected at the rear of the tractor and comprising front and rear gangs, and means connecting the tractor power plant and the rear gang for pulling the rear gang into a working position.

5. In combination, a tractor having a power plant, an offset harrow connected at the rear of the tractor and comprising front and rear gangs and means forming a connection between the front gang and the mid-point of the rear gang, and means connecting the tractor power plant and the rear gang for pulling the rear gang into a working position.

6. In combination, a tractor having a power plant, an offset harrow positioned at the rear of the tractor and comprising front and rear gangs and means forming a connection between the gangs, hitch means connecting the harrow and the tractor for causing the harrow to trail to one side of the tractor, and means for forcing the rear gang into working position comprising a connection between the tractor power plant and a point on the rear gang to the side of the connection opposite the side to which the harrow is offset with respect to the tractor.

7. In combination, a tractor having a power plant, an offset harrow positioned at the rear of the tractor and comprising front and rear gangs and means forming a connection between the gangs, hitch means connecting the harrow and the tractor for causing the harrow to trail to one side of the tractor, and means for pulling the rear gang into working position comprising a connection between the tractor power plant and a point on the rear gang to the side of the connection opposite the side to which the harrow is offset with respect to the tractor.

8. In combination, a tractor having a power plant, an offset harrow connected at the rear of the tractor and comprising front and rear gangs tending to run to one side of the tractor in working position, and means forming a connection between the gangs, and means for forcing the harrow into working position comprising a connection between the tractor power plant and the rear gang.

9. The combination specified in claim 8, the means for forcing the harrow into working position having a part on the tractor which is shiftable with respect to the tractor.

10. The combination specified in claim 8, the means for forcing the harrow into working position having a part on the tractor which is shiftable longitudinally of the tractor.

11. In combination, a tractor having a power plant, an offset harrow connected at the rear of the tractor and comprising front and rear gangs tending to run to one side of the tractor in working position and means forming a connection between the gangs, and means for forcing the harrow into working position comprising a connection between the tractor power plant and the rear gang retained generally adjacent the connection of the harrow and the tractor.

12. In combination, a tractor having a power plant, an offset harrow connected at the rear of the tractor and comprising front and rear gangs tending to run to one side of the tractor in working position and means forming a connection between the gangs, and means for forcing the harrow into working position comprising a connection between the tractor power plant and the rear gang retained generally adjacent the connection of the harrow and the tractor and having a part on the tractor which is shiftable longitudinally of the tractor.

13. In combination, a tractor, a harrow connected at the rear thereof and having a gang, a flexible member for shifting the gang extending along the harrow to the tractor and having a stop portion, and stop means adjustably mounted on the harrow and engageable with the stop means on the flexible member.

14. In combination, a tractor, a harrow connected at the rear thereof and having a gang, a flexible member for shifting the gang extending along the harrow to the tractor and having a stop portion, and stop means adjustably mounted on the harrow and embracing the flexible member and engageable with the stop means on the flexible member.

15. In combination, a tractor, a harrow connected at the rear thereof and having a gang, a flexible member for shifting the gang extending along the harrow to the tractor and having a stop portion, and a member pivotally mounted on the harrow and fixable to the harrow in a plurality of positions and having a portion embracing the flexible member and engageable with the stop means on the flexible member.

16. In combination, a tractor, a harrow connected at the rear thereof and having a gang, a lever pivotally mounted on the harrow and fixable to the harrow in a plurality of positions and having a control portion at one end within reach of an operator on the tractor, means connecting the gang and the other end of the lever so as to be embraced thereby and having a stop portion engageable with the said other end of the lever.

17. In combination, a tractor having a power plant, a harrow connected at the rear of the tractor and having a gang, means connecting the gang and the tractor power plant and having a stop portion, a control member mounted on the harrow so as to be fixed thereto in a plurality of positions and having a handle portion within reach of an operator on the tractor and another portion embracing the said connecting means and engageable with the stop portion thereon.

18. In combination, a tractor having a power plant, a harrow connected at the rear of the tractor and having a gang, a flexible connection between the tractor power plant and the gang and having a stop portion, a control lever pivoted between its ends on the harrow and fixable thereto in a plurality of positions and having a handle portion at one end within easy reach of an operator on the tractor, and a portion at the other end embracing the flexible connection and engageable with the stop portion thereof.

CLEMMA R. RANEY.